Patented Mar. 15, 1927.

1,621,188

UNITED STATES PATENT OFFICE.

JOHN W. BECKMAN, OF OAKLAND, CALIFORNIA, ASSIGNOR OF SIXTY PER CENT TO GEORGE C. ROEDING, OF PIEDMONT, CALIFORNIA.

PROCESS OF PICKLING FRUIT, ETC.

No Drawing. Application filed December 8, 1925. Serial No. 74,176.

This invention relates to an improved process of pickling and preserving fruits and other vegetable matter, and the primary object of the invention is to provide such an improved process whereby fruits and the like can be pickled and preserved in a period of time considerably shorter than that necessary in the processes now known and used.

The present customary method of pickling and preserving fruit, such as olives, is to submit the same to a lactic acid fermentation in which the sugars present in the fruit are hydrolyzed, forming free lactic acid and other products. This treatment requires a considerable period of time. In the case of so treating olives, the time consumed before the olives are ready for consumption is from three to six months.

I have found that the same results can be obtained in considerably less time by submitting the fruit, or other vegetable matter, to an acid treatment in which the acid is highly dissociated when diluted, hydrochloric acid being such an acid. The more dissociated the acid, the quicker the treating action on the fruit is accomplished; for example, in the pickling of green olives, I treat the green olives with a 2% solution of caustic soda for the purpose of opening the pores of the fruit so that the acid may gain ready access. This treatment ordinarily consumes 4 to 6 hours.

The fruit is thereafter submitted to a treatment of hydrochloric acid solution of 1.5 per cent strength, and approximately 12% brine of common salt (sodium chloride). The purpose of the sodium chloride is to impregnate the olives with salt and thus save the time of a separate later operation for this purpose. The period of time during which the olives are permitted to remain in this solution depends upon the nature of the olives and the speed at which the action progresses, such time ordinarily being about two to four days.

When the olives show the desired color, they are removed and placed in a solution containing sodium lactate and lactic acid, approximately one per cent cent of each, and a ten per cent solution of sodium chloride. The sodium lactate reacts with the hydrochloric acid present in the olives, forming sodium chloride and free lactic acid, these giving, together with the acid in the water, the desired acidity to the olives. I can also use caustic soda or other materials for the purpose of neutralizing the free hydrochloric acid in the olives. The hydrochloric acid hydrolyzes the bitter material present in the olives and produces a solid firm product having the pleasing olive flavor free from all bitter taste. The washing in this final solution is carried out until the desired elimination of the free hydrochloric acid is accomplished, the period of time necessary for accomplishing this action varying, but ordinarily taking approximately one week.

Ripe olives may be treated in the same manner, with the difference however that no lactic acid or sodium lactate is added, but that the free hydrochloric acid in the olives is eliminated by a second washing in a one per cent solution of caustic soda. The remaining caustic soda is eliminated by washing in water and a three per cent solution of sodium chloride.

The ripe olives treated in this manner have a very delicate flavor, are perfectly sterile, and the color thereof may be improved if desired, by treating with some highly oxidizing agent such as chloride of lime, or hypochlorous acid and its salts. After the final treatment the olives are packed as is the usual custom in a three per cent salt brine.

Although I have herein mentioned certain concentrates of solution used in my process, I want it to be understood that they are not absolute but may be varied as circumstances may demand.

Having thus described my invention, what I claim is:

1. The process of preserving fruits and the like which are capable of being preserved by pickling, consisting of opening the pores thereof by treating with a caustic solution, thereafter treating the fruit with a dilute acid, such as hydrochloric acid, which is highly dissociated when diluted, and thereafter treating the fruit to eliminate the hydrochloric acid present therein.

2. The process of preserving fruits and the like which are capable of being preserved by pickling, consisting of opening the pores thereof by treating the fruit with a caustic solution for a few hours, thereafter treating the fruit for a few days with a dilute acid, such as hydrochloric acid, which is highly dissociated when diluted, and thereater treating the fruit to eliminate the hydrochloric acid present therein.

3. The process of preserving fruits and the like which are capable of being preserved by pickling, consisting of opening the pores thereof by treating the same with a caustic solution, thereafter treating the fruit with a dilute acid, such as hydrochloric acid, which is highly dissociated when diluted, and thereafter treating the fruit with a lactate to neutralize the acid present and to form lactic acid in a manner giving the desired acidity to the fruit.

4. The process of preserving fruits and the like which are capable of being preserved by pickling, consisting of opening the pores thereof by treating the fruit with a caustic solution for a period of approximately four to six hours, thereafter treating the fruit for a period approximately two to four days with a dilute acid, such as hydrochloric acid, which is highly dissociated when diluted, and thereafter treating the fruit with a lactate for several days to neutralize the acid present and to form lactic acid in a manner giving the desired acidity to the fruit.

5. The process of pickling and preserving olives, consisting of opening the pores thereof by treating with a caustic solution, thereafter treating the fruit with a dilute acid, such as hydrochloric acid, which is highly dissociated when diluted, and thereafter treating the fruit to eliminate the hydrochloric acid present therein.

JOHN W. BECKMAN.